June 20, 1933.   S. M. KOSTOHRIS   1,914,830
HOSE JUMPER
Filed April 4, 1932
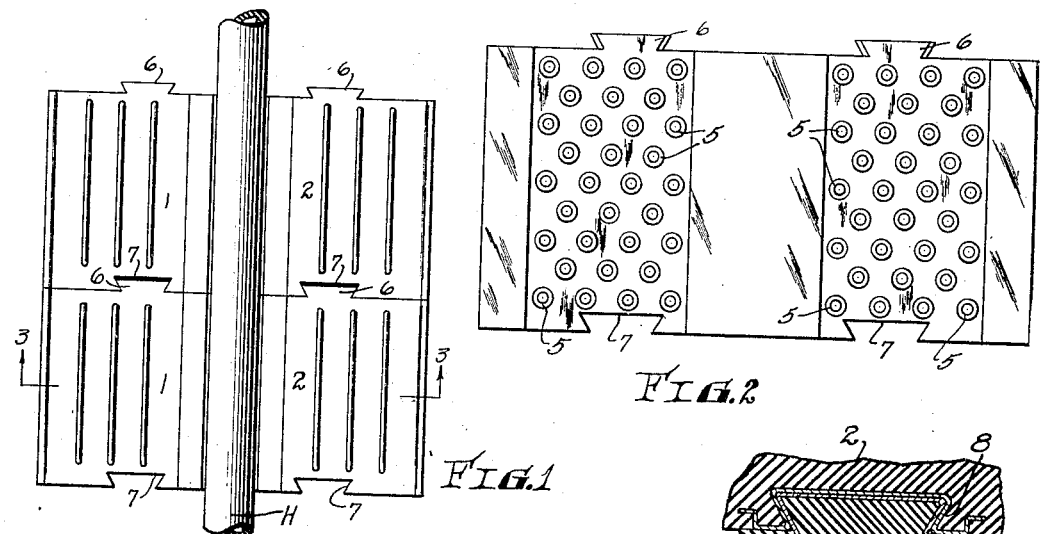
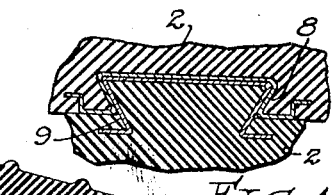
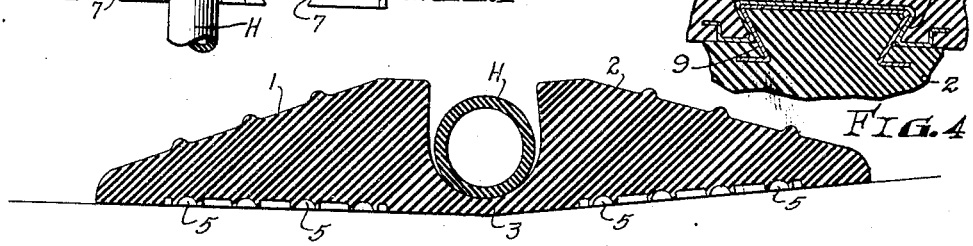
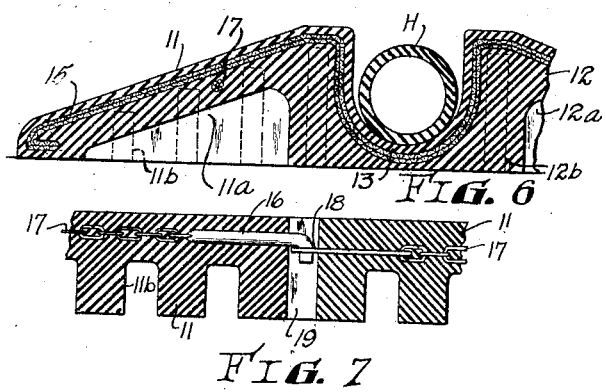
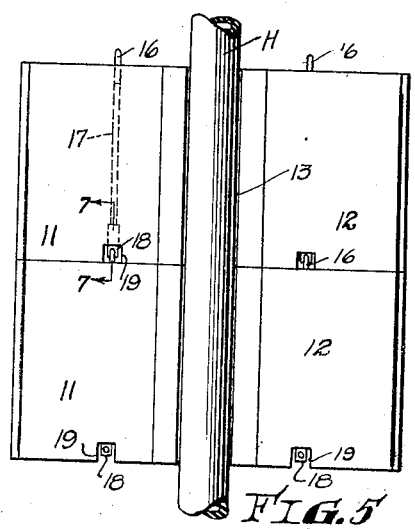
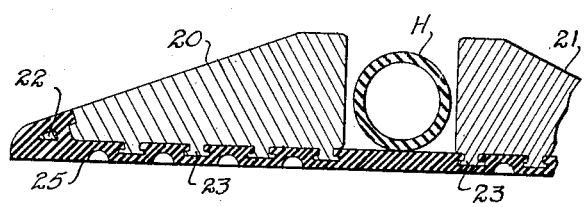
INVENTOR
Stanley M. Kostohris
BY Justin W. Macklin
ATTORNEY Patented June 20, 1933

1,914,830

UNITED STATES PATENT OFFICE

STANLEY M. KOSTOHRIS, OF CLEVELAND, OHIO

HOSE JUMPER

Application filed April 4, 1932. Serial No. 602,929.

This invention relates primarily to devices for protecting fire hose and the like when lying in the streets, and for providing opposed ramps so connected as to furnish a passage or supporting saddle for the hose, and to permit passage of wheels over the same without distortion of the hose or injury thereto.

Other objects include the arrangement of an easily transportable and quickly applied hose jumper, which shall be sufficiently flexible to fit irregularities of the road surface and yet sufficiently strong to support heavy weights such as the wheels of fire engines, ladder trucks and the like.

Another object is to so arrange the hose jumper units that while each unit is sufficiently wide to support one or more wheels side by side, two units may be spaced conveniently to the tread of an automobile or truck, that additional units may be placed end to end and secured together.

The invention contemplates the making, in a unitary or substantially unitary structure, of a pair of opposed ramps or wedge shaped members with thick ends adjacent and so connected as to form a saddle or seat sufficiently large to embrace a fire hose, and of sufficient height to normally protect the end, causing a wheel of a vehicle to pass freely over the hose.

Other objects include the reinforcing of such a unitary structure such that it may be made of rubber and the like and its weight may be reduced by hollowing out the portions of each ramp or wedge.

Another specific object is to provide a series of pads or vacuum cups or the like on the lower surfaces of the wedges to prevent shifting of the hose jumpers while in use.

The invention may take various forms, including that of providing a flexible rubber composition or the like for a base, which is provided with non-skid or pavement gripping surfaces, and on which are mounted the opposed ramps or wedges made of rigid material.

The specific object is to provide a means for securing a plurality of hose jumper units in contiguous end to end positions.

In the drawing—

Fig. 1 is a plan view of two hose jumper units arranged end to end.

Fig. 2 is a bottom plan of one of such units.

Fig. 3 is a vertical transverse section through such a unit, showing it conforming to relatively sloping surfaces of a pavement.

Fig. 4 is a horizontal sectional detail through a dovetail connection between adjacent units.

Fig. 5 is a top plan of such units illustrating other means for securing the units end to end.

Fig. 6 is an enlarged sectional detail of a modified form of the jumper unit.

Fig. 7 is an enlarged vertical sectional detail taken substantially on the line 7—7 of Fig. 5, Figs. 5 and 7 being modified forms of Fig. 6.

Fig. 8 is a vertical transverse section of still another modified form.

Referring to the drawing, the simpler form of my hose jumper comprises a pair of opposed wedges 1 and 2, with a connecting portion 3 forming a trough having a substantially semi-cylindrical bottom for receiving the hose H. This form is preferably made of molded rubber or rubber composition, allowing a degree of flexibility while still providing sufficient strength to support heavy loads passing over the opposed ramps. On the bottom portions are shown cup-like pieces 5 under a greater part of each of the wedges 1 and 2, illustrating any suitable arrangement of a non-slipping surface which might be that similar to a wide variety of pneumatic tire treads.

As a convenient means of attaching two or more of these hose jumper units end to end, I have shown molded on one side of the wedge elements 1 and 2 dovetail lugs 6 adapted to fit into dovetail recesses 7.

In Fig. 4 I have illustrated a suitable reinforcement for the said dovetail lugs and dovetail recesses molded into the rubber, comprising on the one element a recess wall 8 shaped substantially as shown and molded into the rubber. On the other element an interfitting member 9 may extend into the rubber and have outwardly turned portions within the side wall and at the side of the wedge may project outwardly and be formed into the dovetail. These are preferably a loose fit to permit rapid assembling or joining of the elements and easy separation.

In large hose jumpers the weight of a solid piece of rubber composition may be somewhat excessive, in which case I prefer to make the wedge portions 11 and 12 partially hollow, there being a main cavity in each wedge as at 11a and 12a, and a smaller cavity in each wedge as at 11b and 12b. Layers of fabric may be molded into the jumper, as indicated at 15, extending from the outer edge of one wedge along its upper surface downwardly beneath the center saddle 13 and to the other wedge.

In this form I have also illustrated another means of securing these units in end to end relationship, which consists of molding into the rubber at one side of the wedge a short hooked rod 16 preferably connected by a chain or cable 17 with a flat platelike member 18 projecting into a vertical cavity 19, the hooked portion of the member being adapted to engage an opening in the end of the plate 18 within this cavity as shown.

In the modified form shown in Fig. 8, metal or other cheaper material may be used for the body of the opposed wedges. At the thin edge of the wedge and along the bottom I provide suitable lugs 22 and 23 which may engage the rubber base 25 molded thereon, as shown. In this modification the rubber base comprises essentially a thick flat base portion and the hose simply rests upon it between the thickened edges of the wedge elements. Although this type is lighter in construction and more economically manufactured, it possesses all the features of the other types.

In some instances it may be desirable to accommodate several hose lines with the same hose jumper, in which case a plurality of troughs having a semi-cylindrical bottom for receiving the hose may be provided.

Having thus described my invention, I claim:

1. In a hose jumper, a body portion of molded material comprising wedges with their thickened side adjacent and connected by a flexible intermediate portion forming a seat for a hose.

2. A hose jumper comprising a pair of wedge portions connected by a flexible intermediate section forming a seat of sufficient depth to receive the hose diameter below the upper sides of the wedges, and having non-skid lower surfaces, and being molded in one composite piece somewhat flexible but sufficient to support heavy vehicles passing thereover.

3. A hose jumper comprising a pair of wedge portions connected by an intermediate section forming a seat of sufficient depth to receive the hose diameter below the upper sides of the wedges, the wedge portions being hollowed on the lower sides, and having non-skid lower surfaces, and being molded in one composite piece somewhat flexible but sufficient to support heavy vehicles passing thereover.

4. A hose jumper comprising a pair of wedge portions connected by an intermediate section forming a seat for hose sufficient to receive the hose diameter below the upper sides of the wedges, the wedge portions being hollowed on the lower sides, and having non-skid lower surfaces, and being molded in one composite piece somewhat flexible but sufficient to support heavy vehicles passing thereover, and the central portion permitting flexing of the two wedge portions to fit irregular surfaces.

5. In a hose jumper, a body portion of molded material comprising wedges with their thickened sides adjacent and connected by the intermediate portion forming a seat for a hose, and means for connecting a plurality of jumper units in end to end relationship.

6. In a hose jumper, a body portion of molded material comprising wedges with their thickened sides adjacent and connected by the intermediate portion forming a seat for a hose, means for connecting these jumper elements end to end, and hook and eye connections molded into the wedge portions and adapted to connect a plurality of jumper units end to end.

7. In a hose jumper, the combination of a pair of opposed broad wedges having their side faces adjacent but separated sufficiently to admit fire hose, a base member molded onto said wedges and connecting the same, and formed of somewhat flexible material.

8. In a hose jumper, the combination of a pair of opposed broad wedges having their side faces adjacent but separated sufficiently to admit fire hose, a base member molded onto said wedges and connecting the same, and formed of somewhat flexible material, and cavities for holding the base member of rubber or like material to the wedge elements and non-skid surfaces on the base member.

9. In a hose jumper, the combination of a pair of opposed broad wedges having their side faces adjacent but separated sufficiently to admit fire hose, a base member molded onto said wedges and connecting the same, and formed of somewhat flexible material, and the central portion permitting flexing of the two wedge portions to fit irregularities of the road surface.

In testimony whereof, I hereunto affix my signature.

STANLEY M. KOSTOHRIS.